(12) United States Patent
Zhou et al.

(10) Patent No.: US 10,859,098 B2
(45) Date of Patent: Dec. 8, 2020

(54) DRIVE DEVICE

(71) Applicant: Zhejiang Dongxin iTechnology Co., Ltd., Zhuji (CN)

(72) Inventors: Fengping Zhou, Zhuji (CN); Xinjiang Zhou, Zhuji (CN); Guoyao Wu, Zhuji (CN); Xiaoke Zhou, Zhuji (CN); Dong Chen, Zhuji (CN)

(73) Assignee: Zhejiang Dongxin iTechnology Co., Ltd., Zhuji (CN)

( * ) Notice: Subject to any disclaimer, the term of this patent is extended or adjusted under 35 U.S.C. 154(b) by 109 days.

(21) Appl. No.: 16/233,167

(22) Filed: Dec. 27, 2018

(65) Prior Publication Data

US 2020/0127535 A1 Apr. 23, 2020

(30) Foreign Application Priority Data

Oct. 22, 2018 (CN) .......................... 2018 1 1229576

(51) Int. Cl.
| | |
|---|---|
| *H02K 9/06* | (2006.01) |
| *H02K 5/20* | (2006.01) |
| *H02K 11/30* | (2016.01) |
| *F28F 3/02* | (2006.01) |
| *H02K 9/19* | (2006.01) |

(Continued)

(52) U.S. Cl.
CPC ......... *F04D 29/5806* (2013.01); *F04D 13/06* (2013.01); *F04D 25/082* (2013.01); *F04D 29/426* (2013.01); *F04D 29/588* (2013.01); *F04D 29/5813* (2013.01); *F04D 29/628* (2013.01); *H02K 5/04* (2013.01); *H02K 5/18* (2013.01); *H02K 5/20* (2013.01); *H02K 5/225* (2013.01); *H02K 9/14* (2013.01); *H02K 11/33* (2016.01); *H02K 5/165* (2013.01); *H02K 9/06* (2013.01); *H02K 9/19* (2013.01); *H02K 11/30* (2016.01)

(58) Field of Classification Search
CPC . H02K 5/20; H02K 9/06; H02K 11/30; H02K 5/165; H02K 9/19; H02K 5/04; H02K 7/14; F28F 3/02; F04D 13/06; F04D 29/5806
USPC .......................................................... 310/59
See application file for complete search history.

(56) References Cited

U.S. PATENT DOCUMENTS

| | | | | |
|---|---|---|---|---|
| 3,644,067 | A * | 2/1972 | Yowell ................... | F04D 13/06 417/370 |
| 3,748,507 | A * | 7/1973 | Sieber ..................... | H02K 9/14 310/58 |

(Continued)

*Primary Examiner* — Alex W Mok
(74) *Attorney, Agent, or Firm* — Schwegman Lundberg & Woessner, P.A.

(57) ABSTRACT

The present invention provides a drive device including a drive motor. The drive motor includes an end cover, a motor housing, a stator, a rotor, a motor shaft, and a bearing. The drive motor further includes a casing and a first heat-dissipating fan used for dissipating heat for the motor housing. The casing is fixedly mounted on a side of the end cover to contain the motor housing into a chamber formed by the casing. The casing and the motor housing are spaced apart at certain intervals to form a gap between the casing and the motor housing for air flow to pass through. The first heat-dissipating fan is connected to the end of the motor shaft away from the end cover to rotate with the motor shaft. The casing is provided with an air inlet and an air outlet for air flow to pass through.

8 Claims, 2 Drawing Sheets

(51) Int. Cl.
*F04D 29/58* (2006.01)
*F04D 13/06* (2006.01)
*H02K 5/04* (2006.01)
*H02K 11/33* (2016.01)
*H02K 5/22* (2006.01)
*H02K 9/14* (2006.01)
*H02K 5/18* (2006.01)
*F04D 25/08* (2006.01)
*F04D 29/62* (2006.01)
*F04D 29/42* (2006.01)
*H02K 5/16* (2006.01)

(56) References Cited

U.S. PATENT DOCUMENTS

| | | | | |
|---|---|---|---|---|
| 4,742,257 A * | 5/1988 | Carpenter | | H02K 9/14 310/57 |
| 4,992,687 A * | 2/1991 | Nel | | H02K 11/048 219/133 |
| 5,804,935 A * | 9/1998 | Radev | | B60K 17/356 318/139 |
| 5,904,471 A * | 5/1999 | Woollenweber | | F02B 37/16 417/307 |
| 6,700,235 B1 * | 3/2004 | McAfee | | H02K 9/06 310/52 |
| 7,923,875 B2 * | 4/2011 | Henry | | H02K 5/225 310/64 |
| 2004/0150270 A1 * | 8/2004 | Nagayama | | H02K 5/20 310/61 |
| 2009/0189492 A1 * | 7/2009 | Horng | | H02K 5/1732 310/67 R |
| 2011/0097219 A1 * | 4/2011 | Hsu | | H02K 5/132 417/321 |
| 2012/0133223 A1 * | 5/2012 | Liu | | H02K 9/14 310/62 |
| 2012/0299427 A1 * | 11/2012 | He | | H02K 23/00 310/154.28 |
| 2014/0191597 A1 * | 7/2014 | Pal | | H02K 9/08 310/62 |
| 2014/0265664 A1 * | 9/2014 | Camilleri | | H02K 11/33 310/59 |
| 2015/0008771 A1 * | 1/2015 | Lee | | H02K 9/06 310/62 |
| 2016/0102676 A1 * | 4/2016 | You | | F04D 29/38 415/1 |
| 2017/0005546 A1 * | 1/2017 | Chou | | H02K 5/20 |
| 2017/0126099 A1 * | 5/2017 | Chou | | H02K 9/06 |

\* cited by examiner

DRIVE DEVICE

CROSS-REFERENCE TO RELATED APPLICATIONS

This Non-provisional application claims priority under 35 U.S.C. § 119(a) on Chinese Patent Application No(s). 201811229576.X filed on Oct. 22, 2018, the entire contents of which are hereby incorporated by reference.

BACKGROUND OF THE INVENTION

Field of the Invention

The present disclosure relates to a drive device and, more particularly, to a heat dissipation structure of a drive device.

Description of the Related Art

Existing drive motors may generate a larger quantity of heat after running for a long time, which may lead to higher internal temperature of the drive motors, thus having a negative effect on service lives of the drive motors.

BRIEF SUMMARY OF THE INVENTION

To solve deficiencies of the prior art, the present disclosure provides a drive device having a high heat dissipation efficiency.

To achieve the above objective, the present disclosure adopts the following technical solutions.

A drive device includes a drive motor. The drive motor includes an end cover, a motor housing, a stator, a rotor, a motor shaft, and a bearing. The motor housing is fixedly mounted on a side of the end cover. The stator is fixed to an inner wall of the motor housing. The rotor is rotatablely arranged in the stator. The motor shaft is connected into the rotor and rotates with the rotor. The bearing is fixed to the end cover and to an end of the motor shaft away from the end cover to rotatablely support the motor shaft. The drive motor further includes a casing and a first heat-dissipating fan used for dissipating heat for the motor housing. The casing is fixedly mounted on a side of the end cover to contain the motor housing into a chamber formed by the casing. The casing and the motor housing are spaced apart at certain intervals to form a gap between the casing and the motor housing for air flow to pass through. The first heat-dissipating fan is connected to the end of the motor shaft away from the end cover to rotate with the motor shaft. The casing is provided with an air inlet and an air outlet for air flow to pass through. The air inlet and the air outlet are respectively arranged at two ends of the casing.

Further, the drive device also may include a control device. The control device may include a control box, a controller electrically connected to the drive motor to control the drive motor to work, and a second heat-dissipating fan used for dissipating heat for the controller. The control box may be mounted on an outer surface of the casing. The controller may be fixed to an inner surface of the control box. The second heat-dissipating fan may be fixed to outside of the control box and may be arranged opposite to the controller.

Further, the control device may also include a heat dissipation fin. The heat dissipation fin may be arranged on an outer surface of the control box and may be arranged opposite to the controller. The second heat-dissipating fan may be connected to the heat dissipation fin.

Further, the control device may also include a user interface for a user to operate. The user interface may be arranged on an upper part of the control box. The controller may be fixed to the inner surface on the upper part of the control box. The heat dissipation fin may be arranged on the outer surface on the upper part of the control box and may be arranged opposite to the controller. The second heat-dissipating fan may be connected to the heat dissipation fin. A distance from the second heat-dissipating fan to the control box may be larger than a distance from the user interface to the control box.

Further, a region of the casing opposite to the control box may be provided with a mounting hole. A region of the control box opposite to the casing may be provided with a mounting projection mating with the mounting hole. An outer surface of the region of the control box opposite to the casing may be provided with a protruding rib. The protruding rib may extend along a direction parallel to the motor shaft.

Further, both the motor housing and the casing may be cylinder-shaped. A central axis line of the motor housing may coincide with a central axis line of the casing. A range of a ratio of an outer diameter of the motor housing to an inner diameter of the casing may be greater than or equal to 0.75 and smaller than or equal to 0.95.

Further, a range of the gap between the motor housing and the casing may be greater than or equal to 5 mm.

Further, the drive motor may also include a air guiding cover for guiding air flow. The air guiding cover may be positioned between the fan and the casing. The air inlet may be arranged at an end of the casing close to the end cover. The air outlet may be arranged at an end of the casing away from the end cover. The air inlet and the air outlet may be respectively positioned at two sides of the air guiding cover.

Further, the drive device may also include a pump device, which may include a pump body and a rotating blade. The pump body may be provided with a pump chamber for containing the rotating blade. The rotating blade may be connected to the motor shaft and may be driven by the motor shaft to rotate. The pump body may be provided with a water inlet and a water outlet communicating with the pump chamber.

Further, the pump device may also include a cooling pipeline. The cooling pipeline may be at least partially positioned in the pump chamber. The pump body may be provided with an opening, and the cooling pipeline passes through the opening. An end of the cooling pipeline may be connected to the air inlet.

Beneficial effects of the present disclosure are as below: the motor housing of the drive device is sleeved with a casing, and a passageway gap is formed between the motor housing and the casing. In this way, the heat dissipation effect of the drive device is enhanced, and thus the service life of the drive device is prolonged.

Numerals: 100—drive device, 10—drive motor, 11—end cover, 12—motor housing, 13—stator, 14—rotor, 15—motor shaft, 16—bearing, 17—casing, 18—first heat-dissipating fan, 19—air inlet, 20—air outlet, 21—control device, 22—control box, 23—controller, 24—second heat-dissipating fan, 25—heat dissipation fin, 26—user interface, 27—mounting hole, 28—protruding rib, 29—air guiding cover, 30—pump device, 31—pump chamber, 32—rotating blade, 33—water inlet, 34—water outlet, 35—pump body, 36—mounting projection, and 37—support frame.

DETAILED DESCRIPTION OF THE INVENTION

The present disclosure is introduced in detail below with reference to the accompanying drawings and embodiments.

Figure 1:
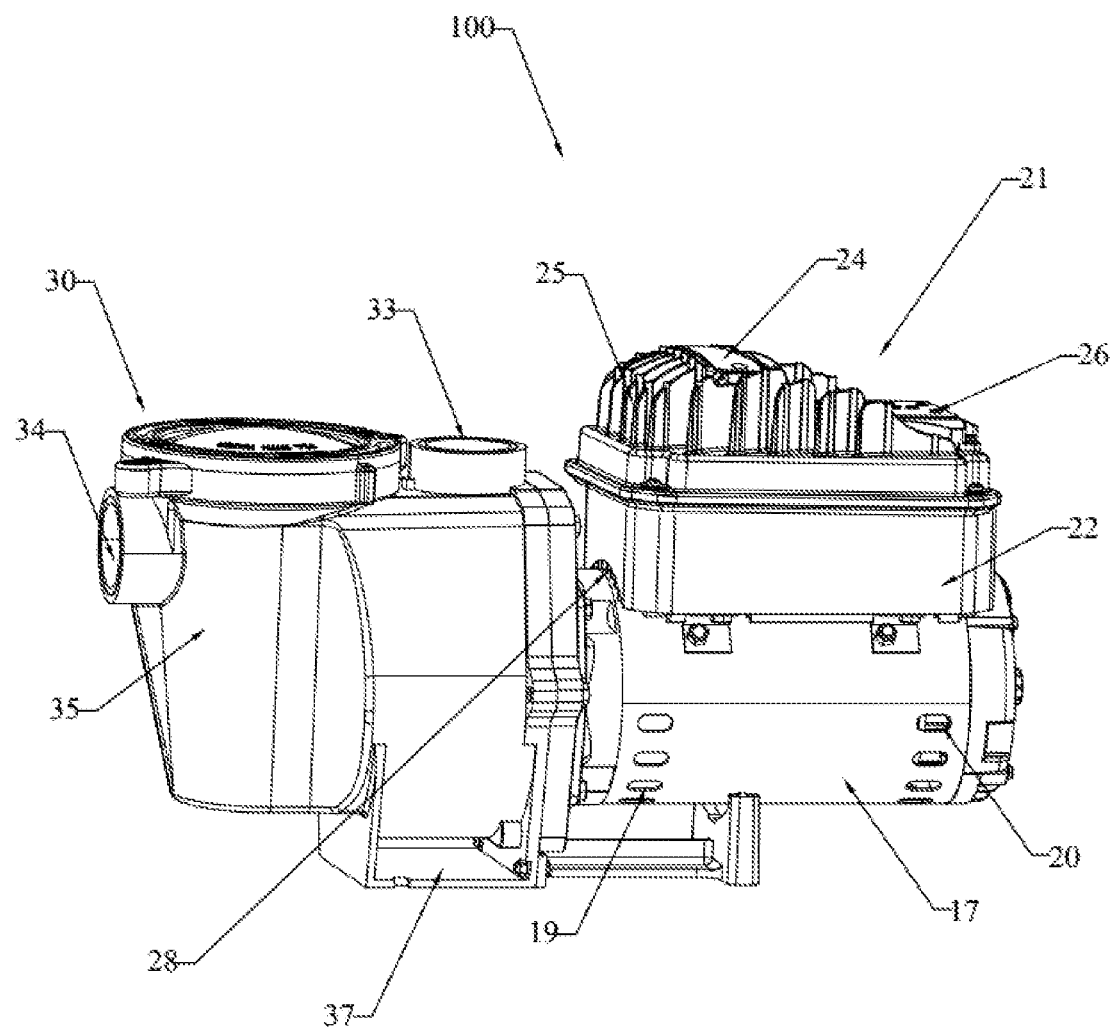
FIG. 1 is a schematic diagram of a drive device according to the present disclosure.
Figure 2:
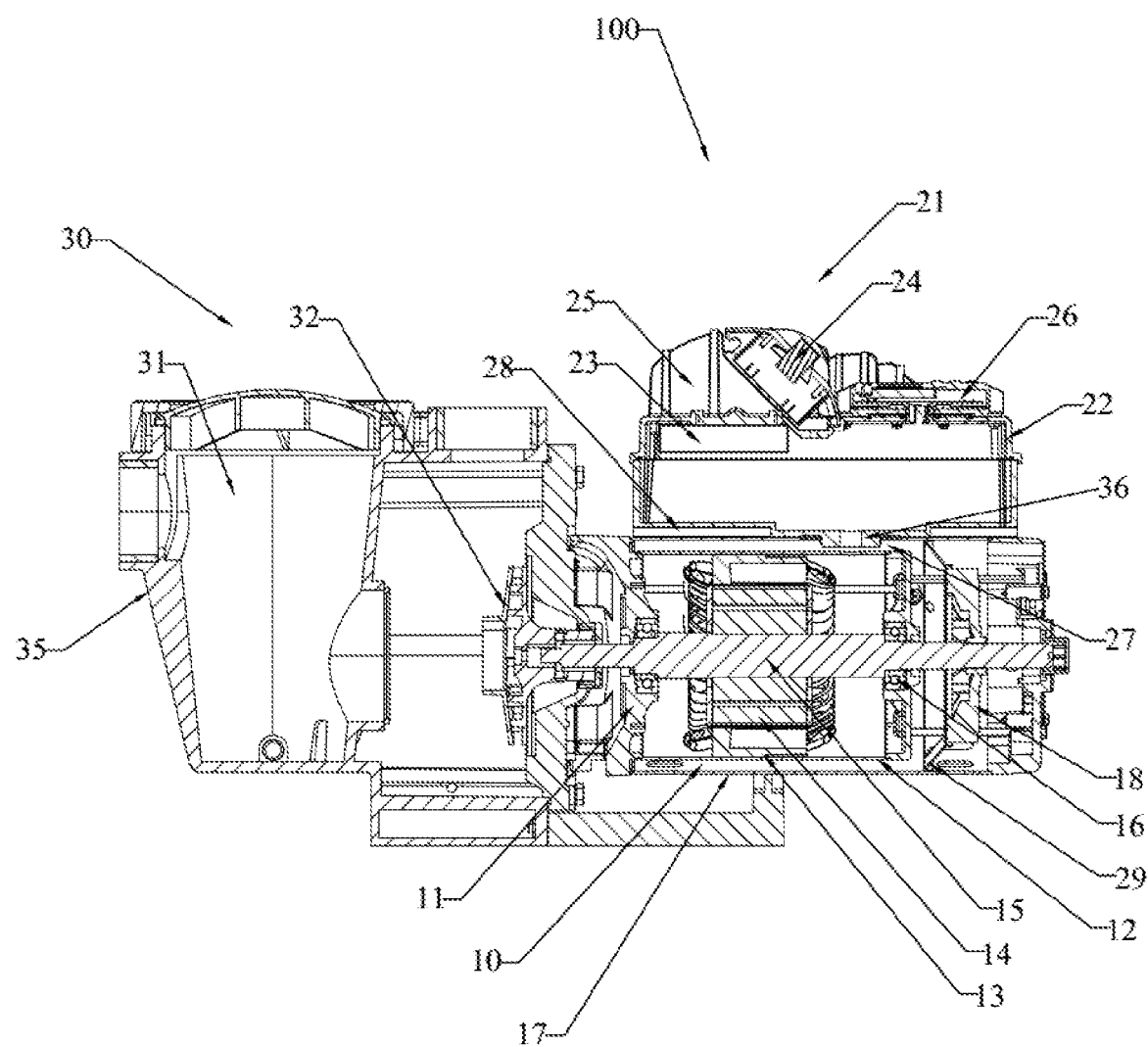
FIG. 2 is a cross-sectional view of the drive device in FIG. 1.

As shown in FIG. 1 and FIG. 2, a drive device 100 includes a drive motor 10. The drive motor 10 includes an end cover 11, a motor housing 12, a stator 13, a rotor 14, a motor shaft 15, and a bearing 16.

Specifically, the motor housing 12 is fixedly mounted on a side of the end cover 11. The stator 13 is fixed to an inner wall of the motor housing 12. The rotor 14 is rotatably arranged in the stator 13. The motor shaft 15 is connected into the rotor 14 and rotates with the rotor 14. The bearing 16 is fixed to the end cover 11 and to an end of the motor shaft 12 away from the end cover 11 to rotatably support the motor shaft 15.

The drive motor 10 further includes a casing 17 and a first heat-dissipating fan 18 used for dissipating heat for the motor housing 12. Specifically, the casing 17 is fixedly mounted on a side of the end cover 11 to contain the motor housing 12 into a chamber formed by the casing 17. The casing 17 and the motor housing 12 are spaced apart at certain intervals to form a gap between the casing 17 and the motor housing 12 for air flow to pass through. The first heat-dissipating fan 18 is connected to the end of the motor shaft 15 away from the end cover 11 to rotate with the motor shaft 15. The casing 17 is provided with an air inlet 19 and an air outlet 20 for air flow to pass through. The air inlet 19 and the air outlet 20 are respectively arranged at two ends of the casing 17.

The drive device 100 is also provided with a support frame 37 used for supporting the drive device 100.

As a preferred embodiment, the drive device 100 further includes a control device 21. Specifically, the control device 21 includes a control box 22, a controller 23, and a second heat-dissipating fan 24. The control box 22 is preferably made of an aluminium material having better heat dissipation performance. The controller 23 is electrically connected to the drive motor 10 to control the drive motor 10 to work, and the second heat-dissipating fan 24 is used for dissipating heat for the controller 23. The control box 22 is mounted on an outer surface of the casing 17. The controller 23 is fixed to an inner surface of the control box 22. The second heat-dissipating fan 24 is fixed to outside of the control box 22 and is arranged opposite to the controller 23.

Specifically, the controller 23 generates a larger quantity of heat in its running process. Therefore, the controller 23 is closely arranged on an inner wall of the control box 22, and the second heat-dissipating fan 24 is fixed to the outside of the control box 22 and is arranged opposite to the controller 23, such that rotation of the second heat-dissipating fan 24 drives air flow on the surface of the control box 22 to flow. In this way, the heat dissipation effect of the controller 23 may be further enhanced.

As a preferred embodiment, the control device 21 also includes a heat dissipation fin 25. The heat dissipation fin 25 is arranged on an outer surface of the control box 22 and is arranged opposite to the controller 23. The second heat-dissipating fan 24 is connected to the heat dissipation fin 25.

On one hand, the heat dissipation fin 25 can enhance the heat dissipation effect of the control box 22, and on the other hand, the heat dissipation fin 25 can guide cooling air flow, driven by the second heat-dissipating fan 24, flowing through the surface of the control box 22.

As a preferred embodiment, the control device 21 also includes a user interface 26 for a user to operate. The user interface 26 is arranged on an upper part of the control box 22. The controller 23 is fixed to the inner surface on the upper part of the control box 22. The heat dissipation fin 25 is arranged on the outer surface on the upper part of the control box 22 and is arranged opposite to the controller 23. The second heat-dissipating fan 24 is connected to the heat dissipation fin 25. A distance from the second heat-dissipating fan 24 to the control box 22 is larger than that from the user interface 26 to the control box 22. By setting the distance from the second heat-dissipating fan 24 to the control box 22 larger than that from the user interface 26 to the control box 22, air flow from the second heat-dissipating fan 24 may be prevented from directly blowing through an operator's hand when the operator operates the user interface 26.

As a preferred embodiment, the center of rotation of the second heat-dissipating fan 24 intersects with the motor shaft, and a range of an included angle between the second heat-dissipating fan 24 and the motor shaft is greater than or equal to 30° and smaller than or equal to 90°, which may further prevent the air flow from the second heat-dissipating fan 24 from directly blowing through the operator's hand. This included angle is 60° in this embodiment.

As a preferred embodiment, a region of the casing 17 opposite to the control box 22 is provided with a mounting hole 27, and a region of the control box 22 opposite to the casing 17 is provided with a mounting projection 36 mating with the mounting hole 17. An outer surface of the region of the control box 22 opposite to the casing 17 is provided with a protruding rib 28. The protruding rib 28 extends along a direction parallel to the motor shaft 15.

Specifically, a region of the casing 17 opposite to the control box 22 is provided with a mounting hole 27, and a region of the control box 22 opposite to the casing 17 is provided with a mounting projection 36 mating with the mounting hole 17. The mounting projection 36 is inserted into the mounting hole 27 when the control box 22 is mounted, which may enhance positioning accuracy of the control box 22. The protruding rib 28 arranged along the direction parallel to the motor shaft 15 increases a surface area of the outer surface of the control box 22 and thus enhances the heat dissipation effect of cooling air flow on the control box 22.

As a preferred embodiment, both the motor housing 12 and the casing 17 are cylinder-shaped. A central axis line of the motor housing 12 coincides with a central axis line of the casing 17. A range of a ratio of an outer diameter of the motor housing 12 to an inner diameter of the casing 17 is greater than or equal to 0.75 and smaller than or equal to 0.95.

Specifically, parameter settings of the outer diameter of the motor housing 12111 and the inner diameter of the casing 1712 are related to ventilation quantity of heat-dissipating air flow and the overall dimension of the drive device 100. The ventilation quantity of the heat-dissipating air flow is ensured under the premise of guaranteeing the overall compact structure and smaller overall size, such that the drive device 100 is maintained at a higher heat dissipation level.

Generally, the range of the ratio of the outer diameter of the motor housing 12 to the inner diameter of the casing 17 is greater than or equal to 0.75 and smaller than or equal to 0.95. In this embodiment, the outer diameter of the motor housing 12 is 72 mm, the inner diameter of the casing 17 is 80 mm, and thus the ratio of the outer diameter of the motor housing 12 to the inner diameter of the casing 17 is 0.9.

As a preferred embodiment, a range of the gap between the motor housing 12 and the casing 17 is greater than or equal to 5 mm. To ensure the ventilation quantity of the heat-dissipating air flow, the range of the gap between the motor housing 12 and the casing 17 is controlled to be greater than or equal to 5 mm. In this embodiment, the gap between the motor housing 12 and the casing 17 is 8 mm.

As a preferred embodiment, the drive motor 10 further includes an air guiding cover 29 for guiding air flow. The air guiding cover 29 is positioned between the first heat-dissipating fan 18 and the casing 17. The air inlet 19 is arranged at an end of the casing 17 close to the end cover 11, and the air outlet 20 is arranged at an end of the casing 17 away from the end cover 11. The air inlet 19 and the air outlet 20 are respectively positioned at two sides of the air guiding cover 29. Specifically, the air guiding cover 29 guides the air flow to the first heat-dissipating fan 18, thereby preventing the air flow from flowing at random and enhancing the heat dissipation effect.

As a preferred embodiment, the drive device 100 further includes a control device 30. The pump device 30 includes a pump body 35 and a rotating blade 32. The pump body 35 is provided with a pump chamber 31 for containing the rotating blade 32. The rotating blade 32 is connected to the motor shaft 15 and is driven by the motor shaft 15 to rotate. The pump body 35 is provided with a water inlet 33 and a water outlet 34 communicating with the pump chamber 31.

As an alternative embodiment, the pump device 30 further includes a cooling pipeline (not shown in the figures). The cooling pipeline is at least partially positioned in the pump chamber 31. The pump body 35 is provided with two openings for the cooling pipeline to pass through. The cooling pipeline passes through the openings, and one end of the cooling pipeline is connected to the air inlet 19. Specifically, temperature of air flow outside the drive device 100 is greatly affected by environmental factors. For example, the temperature of the air flow outside the drive device 100 is higher, and thus the cooling effect is not ideal if the drive motor 10 is cooled down by using the air flow having a higher temperature. However, the air flow is cooled down by water flow in the pump chamber 31 having a lower temperature, and then is guided, via the air inlet 19, into the casing 17 through the cooling pipeline, which may further enhance the cooling effect of the drive motor 10.

The above shows and describes fundamental principles, major characteristics and advantages of the present disclosure. Those skilled in the art should understand that the above embodiments are not intended to limit the present disclosure in any form, and any technical solution obtained based on equivalent replacements or equivalent transformations fall within the scope of protection of the present disclosure.

What is claimed is:

1. A drive device, comprising a drive motor; the drive motor comprising an end cover, a motor housing, a stator, a rotor, a motor shaft, and a bearing; herein the motor housing is fixedly mounted on a side of the end cover, the stator is fixed to an inner wall of the motor housing; the rotor is rotatablely arranged in the stator; the motor shaft is connected into the rotor and rotates with the rotor; the bearing is fixed to the end cover and to an end of the motor shaft away from the end cover to rotatablely support the motor shaft; wherein the drive motor further comprises a casing and a first heat-dissipating fan used for dissipating heat for the motor housing; the casing is fixedly mounted on a side of the end cover to contain the motor housing into a chamber formed by the casing; the casing and the motor housing are spaced apart at certain intervals to form a gap between the casing and the motor housing for air flow to pass through; the first heat-dissipating fan is connected to the end of the motor shaft away from the end cover to rotate with the motor shaft; the casing is provided with an air inlet and an air outlet for air flow to pass through; and the air inlet and the air outlet are respectively arranged at two ends of the casing;

wherein the drive device further comprises a control device, the control device comprises a control box, a controller electrically connected to the drive motor to control the drive motor to work, and a second heat-dissipating fan used for dissipating heat for the controller; the control box is mounted on an outer surface of the casing; the controller is fixed to an inner surface of the control box; and the second heat-dissipating fan is fixed to outside of the control box and is arranged opposite to the controller.

2. The drive device according to claim 1, wherein the control device further comprises a heat dissipation fin; the heat dissipation fin is arranged on an outer surface of the control box and is arranged opposite to the controller; and the second heat-dissipating fan is connected to the heat dissipation fin.

3. The drive device according to claim 2, wherein the control device further comprises a user interface for a user to operate; the user interface is arranged on an upper part of the control box; the controller is fixed to the inner surface on the upper part of the control box; the heat dissipation fin is arranged on the outer surface on the upper part of the control box and is arranged opposite to the controller; the second heat-dissipating fan is connected to the heat dissipation fin; and a distance from the second heat-dissipating fan to the control box is larger than a distance from the user interface to the control box.

4. The drive device according to claim 1, wherein a region of the casing opposite to the control box is provided with a mounting hole; a region of the control box opposite to the casing is provided with a mounting projection mating with the mounting hole; an outer surface of the region of the control box opposite to the casing is provided with a protruding rib; and the protruding rib extends along a direction parallel to the motor shaft.

5. The drive device according to claim 1, wherein both the motor housing and the casing are cylinder-shaped; a central axis line of the motor housing coincides with a central axis line of the casing; and a range of a ratio of an outer diameter of the motor housing to an inner diameter of the casing is greater than or equal to 0.75 and smaller than or equal to 0.95.

6. The drive device according to claim 5, wherein a range of the gap between the motor housing and the casing is greater than or equal to 5 mm.

7. The drive device according to claim 1, wherein the drive motor further comprises a air guiding cover for guiding air flow; the air guiding cover is positioned between the first heat-dissipating fan and the casing; the air inlet is arranged at an end of the casing close to the end cover; the air outlet is arranged at an end of the casing away from the end cover; and the air inlet and the air outlet are respectively positioned at two sides of the air guiding cover.

8. The drive device according to claim 1, wherein the drive device further comprises a pump device; the pump device comprises a pump body and a rotating blade; the pump body is provided with a pump chamber for containing the rotating blade; the rotating blade is connected to the motor shaft and is driven by the motor shaft to rotate; and the pump body is provided with a water inlet and a water outlet communicating with the pump chamber.

\* \* \* \* \*